(12) United States Patent  
Zhu et al.

(10) Patent No.: US 11,194,142 B2
(45) Date of Patent: Dec. 7, 2021

(54) MICROSCOPE HAVING THREE-DIMENSIONAL IMAGING CAPABILITY AND THREE-DIMENSIONAL MICROSCOPIC IMAGING METHOD

(71) Applicant: UNIVERSITY OF SCIENCE AND TECHNOLOGY OF CHINA, Hefei (CN)

(72) Inventors: Qingyuan Zhu, Hefei (CN); Guoqiang Bi, Hefei (CN); Hao Wang, Hefei (CN); Pak-Ming Lau, Hefei (CN); Lufeng Ding, Hefei (CN); Chaoyu Yang, Hefei (CN); Qianru Yang, Hefei (CN); Dasheng Bi, Hefei (CN); Qi Xin, Hefei (CN)

(73) Assignee: University of Science and Technology of China, Anhui (CN)

( * ) Notice: Subject to any disclaimer, the term of this patent is extended or adjusted under 35 U.S.C. 154(b) by 257 days.

(21) Appl. No.: 16/394,491

(22) Filed: Apr. 25, 2019

(65) Prior Publication Data

US 2019/0250385 A1 Aug. 15, 2019

Related U.S. Application Data

(63) Continuation-in-part of application No. PCT/CN2016/108705, filed on Dec. 6, 2016.

(30) Foreign Application Priority Data

Oct. 26, 2016 (CN) .......................... 201610951388.2

(51) Int. Cl.
*G02B 21/00* (2006.01)

(52) U.S. Cl.
CPC ......... *G02B 21/0032* (2013.01); *G02B 21/00* (2013.01); *G02B 21/0028* (2013.01); *G02B 21/0036* (2013.01); *G02B 21/0052* (2013.01)

(58) Field of Classification Search
CPC .. G02B 21/0032; G02B 21/06; G02B 21/367; G02B 21/0028; G02B 21/0052; G02B 21/0036

(Continued)

(56) References Cited

U.S. PATENT DOCUMENTS 5,969,854 A 10/1999 Stelzer et al.
2009/0231689 A1 9/2009 Pittsyn et al.

(Continued)

FOREIGN PATENT DOCUMENTS

CN 1269517 10/2000
CN 102427502 4/2012

(Continued)

OTHER PUBLICATIONS

CN Office Action in Chinese Appln. No. 201610951388.2, dated Aug. 1, 2019, 24 pages (with English Translation).

(Continued)

*Primary Examiner* — Kristina M Deherrera
(74) *Attorney, Agent, or Firm* — Fish & Richardson P.C.

(57) ABSTRACT

A microscope having three-dimensional imaging capability and a three-dimensional microscopic imaging method are provided, the microscope including: at least one excitation device configured to generate a detectable contrast in a detection target region of a sample which is to be detected, in an excitation principal axis direction; at least one detection device, configured to detect the contrast as generated from the detection target region of the sample in a detection principal axis; and at least one movement mechanism, configured to generate a relative movement of the sample relative to the excitation device and the detection device; the relative movement is in a direction neither parallel to nor perpendicular to the excitation principal axis direction or the detection principal axis direction.

23 Claims, 10 Drawing Sheets

(58) Field of Classification Search
USPC .......................................................... 359/368
See application file for complete search history.

(56) References Cited

U.S. PATENT DOCUMENTS

| | | | | |
|---|---|---|---|---|
| 2012/0206798 | A1* | 8/2012 | Knop | .................... G02B 21/002 |
| | | | | 359/385 |
| 2012/0288157 | A1 | 11/2012 | Kishima | |
| 2015/0029325 | A1 | 1/2015 | Dholakia et al. | |
| 2015/0355094 | A1 | 12/2015 | Fukuyama | |
| 2016/0291306 | A1* | 10/2016 | Fukuda | .............. G01N 15/1434 |
| 2016/0305883 | A1* | 10/2016 | Betzig | .................... G02B 21/06 |

FOREIGN PATENT DOCUMENTS

| | | |
|---|---|---|
| CN | 103048300 | 4/2013 |
| CN | 103245302 A | 8/2013 |
| CN | 103744172 | 4/2014 |
| CN | 104570315 | 4/2015 |
| CN | 105044898 | 11/2015 |
| CN | 105116529 A | 12/2015 |
| EP | 3244249 | 11/2017 |
| JP | H 0356917 | 3/1991 |
| JP | H0356917 A | 3/1991 |
| JP | H 10239036 | 9/1998 |
| JP | H10239036 A | 9/1998 |
| JP | H 10311950 | 11/1998 |
| JP | 2005-84643 | 3/2005 |
| JP | 2007306548 | 11/2007 |
| JP | 2010072014 | 4/2010 |
| JP | 2012-237693 | 12/2012 |
| JP | 2014507014 | 3/2014 |
| JP | 2014-164096 | 9/2014 |
| JP | 2015-72458 | 4/2015 |
| WO | 2013/126999 | 9/2013 |
| WO | WO 2015/109323 | 7/2015 |
| WO | WO 2016/054474 | 4/2016 |
| WO | WO 2016/152823 | 9/2016 |

OTHER PUBLICATIONS

CN Office Action in Chinese Appln. No. 201610951388.2. dated Feb. 21, 2019, 9 pages (with English Translation).
CN Office Action in Chinese Appln. No. 201610951388.2, dated Nov. 26, 2019, 72 pages (with English translation).
Extended European Search Report in European Appln. No. 16919938.7, dated May 29, 2020, 30 pages.
Glaser et al., "A light sheet microscopy system for rapid, volumetric imaging and pathology of large tissue specimens," Biomedical Optics Congress, 2016, 3 pages.
Gong et al., "High-throughput dual-colour precision imaging for brain-wide connectome with cytroarchitectonic," Nat. Commun., 2016, 7:12142, 12 pages.
JP Office Action in Japanese Appln. No. 2019-522949, dated May 26, 2020, 10 pages (with English Translation).
Kumar et al., "Dual-view plane illumination microscopy for rapid and spatially isotropic imaging," Nature Protocols, 2014, 9(11):2555-73.
Kumar et al., "Using Stage- and Slit-Scanning to Improve Contrast and Optical Sectioning in Dual-View Inverted Light Sheet Microscopy (diSPIM)," Biol Bull, 2016, 231(1):26-39.
Piksarv et al., "A Compact Two Photon Light Sheet Microscope for Applications in Neuroscience," Optical Society of America, 2016, 2 pages.
Richardson et al., "Clarifying Tissue Clearing," Cell, 2015, 162(2):246-257.
Wu et al., "Simultaneous multiview capture and fusion improves spatial resolution in wide-field and light-sheet microscopy," Optica, 2016, 3(8):897-910.
Yang et al., "A compact light-sheet microscope for the study of the mammalian central nervous system," Scientific Reports, 2015, 6:26317, 7 pages.
Ye et al., "Wiring and Molecular Features of Prefrontal Ensembles Representing Distinct Experiences," Cell, 2016, 165(7):1776-1788.
Zhang et al., "Light-sheet microscopy by confocal line scanning of dual-Bessel beams," Journal of Biomedical Optics, 2016, 21(10):100502-1-100502-4.
Decision of Refusal issued in Japanese Application No. 2019-522949, dated Oct. 20, 2020, 8 pages (with English Machine Translation).
SIPO of Republic of China, International Search Report for PCT/CN2016/108705 dated Jul. 28, 2017 (English translation).
dispim.org [online], "Labview," available on or before Oct. 26, 2016, via Internet Archive: Wayback Machine URL <http://web.archive.org/web/20161026152426/http://dispim.org/software/labview>, [Retrieved on May 14, 2021], URL<http://dispim.org/software/labview>, 4 pages.
EP Office Action in European Appln. No. 16919938.7, dated May 25, 2021, 11 pages.

* cited by examiner

MICROSCOPE HAVING THREE-DIMENSIONAL IMAGING CAPABILITY AND THREE-DIMENSIONAL MICROSCOPIC IMAGING METHOD

CROSS-REFERENCE TO RELATED APPLICATIONS

This application is a continuation-in-part of International Application No. PCT/CN2016/108705, filed on Dec. 6, 2016, entitled "MICROSCOPE HAVING THREE-DIMENSIONAL IMAGING CAPABILITY AND IMAGING METHOD", which has been published and claims priority to Chinese Patent Application Invention No. 201610951388.2 filed on Oct. 26, 2016 in the State Intellectual Property Office of China, the whole disclosure of which is incorporated herein by reference.

BACKGROUND OF THE DISCLOSURE

Field of the Disclosure

Embodiments of the present disclosure generally relate to the technical field of imaging microscope and microscopic imaging method, and in particular, to a high-throughput three-dimensional digital-imaging microscope and a high-throughput three-dimensional microscopic digital-imaging method both of which are mainly applicable to biological and medical technology fields.

Description of the Related Art

Three-dimensional digital imaging is an important implementation of modern microscopy. And a three-dimensional microscopy has a vital purpose of imaging relatively more samples in a field of view in a non-destructive manner, on the premise that the resolution thereof is not decreased.

Generally speaking, the three-dimensional digital imaging may detect a sample by a method which produces a contrast response (e.g., fluorescent light) and for example is specifically implemented by excitation a fluorescent light, and may record the contrasts by another method which for example obtains analog quantities above all through a photoelectric conversion processing and then performs digitization processing on the analog quantities, and may in turn digitizing a respective one of the contrasts for each volume element within a detection target region to be detected into a respective voxel (also referred to as "volumetric pixel" which is three-dimensional) which serves as a final throughput. Hereby, the specific number of voxels is defined to be a volume of the detection target region divided by a volume of a volume element (the volume of a volume element is determined by a required resolution) corresponding to the voxel, and thus the specific number of voxels cooperates with a digitization speed to determine collectively an upper limit of the speed of the three-dimensional digital imaging. However, a practical imaging speed in the relevant art is far from reaching such an upper limit. In a relevant major/mainstream imaging apparatus, by taking its typical digitization speed (16 bit) of 400 megapixels per second as an example, in a process of imaging a mouse brain having a volume of 0.5 cubic centimeter, then, in a condition that a size of a three-dimensional voxel is set corresponding to a sample unit of 1 micrometer×1 micrometer×1 micrometer (i.e., a sub-cellular resolution) within a sample (in other words, the sample unit is to be imaged as the respective one voxel which is three-dimensional), an upper limit of the digital imaging speed should be 1250 seconds, i.e., approximating to 21 minutes; and in a condition that the size of the voxel is set corresponding to a sample unit of 5 micrometers×5 micrometers×5 micrometers (i.e., a soma resolution), an upper limit of the digital imaging speed may merely require 10 seconds. However, in relevant art, typically, a practical imaging speed for imaging a mouse brain in a condition of a sub-micron resolution may be 3 days (Gong, H. et al. High-throughput dual-colour precision imaging for brain-wide connectome with cytoarchitectonic landmarks at the cellular level. Nat. Commun. 7:12142, doi: 10.1038/ncomms12142 (2016)); and a practical imaging speed as a latest result in a condition of a soma resolution may be about 2 hours (Li Ye, et al. Wiring and Molecular Features of Prefrontal Ensembles Representing Distinct Experiences, Cell, Volume 165, Issue 7, 16 Jun. 2016, Pages 1776-1788, ISSN 0092-8674, http://dx.doi.org/10.1016/j.cell.2016.05.010). As far as a relevant art is concerned, neither a speed of the excitation nor the speed of the recording is a bottle-neck issue; in other words, the bottle-neck issue lies in a subsequent processing speed, i.e., a practical digital imaging speed. And an important reason for causing a difference between a theoretical upper limit of the digital imaging speed and a practical digital imaging speed lies in that it may be inevitable to incur a pause or a stop in the process of the imaging, such that the pause or the stop in the imaging may result in a shortened effective imaging time.

A relevant imaging technology typically adopts such a solution that, specifically for example, the three-dimensional imaging of the sample may comprise following steps:
  a step of imaging in a field of view, comprising:
  above all, imaging a plane perpendicular to an imaging direction (i.e., a detection principal axis direction, generally referred to as 'z' direction), for example a point-by-point imaging, or alternatively an imaging across a portion or all of the field of view during a same time period or at a same moment, such as confocal scanning microscopy, or selective/single plane illumination microscopy (abbreviated as SPIM, or referred to as light sheet fluorescence microscopy (abbreviated as LSM)), or the like;
  next, driving the sample to perform a relative movement in z direction with respect to an excitation device and a detection device to displace to a new plane, depending on resolution requirement, this step lasting for about 10 milliseconds;
  then, imaging the new plane; and
  subsequently, repeating above movement and imaging, until a three-dimensional imaging in a field of view covering all of the sample in the z direction is completed,
  then, a step of moving to and imaging in another field of view, specifically comprising:
  moving the sample in a direction perpendicular to the z direction to a new field of view, this step lasting for about hundreds of milliseconds; and
  next, performing an imaging in the new field of view, and then repeating the movement of the sample and imaging within the new field of view, until a three-dimensional imaging in the new field of view covering all of the sample in the z direction is completed,
  subsequently, repeating above movement and imaging, until a complete three-dimensional imaging covering all of the sample in a direction perpendicular to the z direction is also completed.

In above processes, a mass of interruptions to imaging are involved therein.

For example, a movement time may be required for each movement itself; and a waiting time may be required for further waiting for waiting for dissipation or vanishment of vibration caused by start/restart, or pause/stop till the sample reaches a steady condition relative to the excitation device and the detection device, then imaging processes may proceed again, resulting in relatively long interruptions in imaging processes. In a condition that the volume of the sample is relatively large and the resolution requirement is relatively high, specific number of above interruptions in imaging may for example be increased at a cubic power, which may seriously influence imaging efficiency. A portion of technologies may take advantages of solutions such as an electric focusing lens and the like to decrease the time of interruptions in imaging, but these solutions may merely be adapted to the z direction, and have relatively large restrictions in scale, partially improving the throughput of the three-dimensional digital imaging.

SUMMARY OF THE DISCLOSURE

The embodiments of the present disclosure have been made to overcome or alleviate at least one aspect of the above mentioned disadvantages and/or shortcomings in the prior art, by providing a microscope having three-dimensional imaging capability and a three-dimensional microscopic imaging method, which may improve effectively imaging time and implementing a high-throughput three-dimensional microscopy.

Following technical solutions are adopted in exemplary embodiments of the invention for achieving the above desired technical purposes.

According to an aspect of the exemplary embodiment of the present disclosure, there is provided a microscope having three-dimensional imaging capability, comprising:

at least one excitation device, which is configured to generate a detectable contrast in a detection target region of a sample which is to be detected, in an excitation principal axis direction;

at least one detection device, which is configured to detect the contrast as generated from the detection target region of the sample in a detection principal axis and in turn to perform imaging depending on the detected contrast; and at least one movement mechanism, which is configured to generate a relative movement of the sample relative to the at least one excitation device and the at least one detection device;

the relative movement is implemented in a direction which is neither parallel to nor perpendicular to the excitation principal axis direction and also is neither parallel to nor perpendicular to the detection principal axis direction.

In overall processes of imaging a three-dimensional region of the sample to be detected, neither imaging processes nor the relative movements has pause or stop therein, and the relative movement is implemented neither parallel to nor perpendicular to the excitation principal axis direction and also is neither parallel to nor perpendicular to the detection principal axis direction. And it is required that a choice of the direction of each relative movement should contribute to decrease switching operations each of which occurs between adjacent fields of view and interrupts the imaging processes.

And the relative movements during imaging may be set at a constant speed substantially without any stop, thus eliminating any irregular dithering incurred by speed change, start, or pause or stop. Accordingly, any imaging blurring incurred by potentially existing movement may be simple and consistent, for example, such that the blurring may be readily eliminated by de-convolution and the like.

According to an embodiment of the disclosure, in the detection target region of the at least one detection device, each of sample units is merely excited by the at least one excitation device for not longer than a time period in which a displacement of each of sample units due to the relative movement is not more than a requirement in resolution of the microscope, each sample unit being corresponding to a respective one of voxels which are imaged. As such, the blurring incurred by relative movement is negligible.

According to an embodiment of the disclosure, an environment where the sample is located is filled with a transparent material having its refractive index similar or equal to a refractive index of the sample.

According to an embodiment of the disclosure, the at least one excitation device comprises an excitation light source selected from a group comprising: one or more light-emitting diodes, one or more continuous lasers, one or more pulsed lasers, or any combination thereof.

According to an embodiment of the disclosure, the detectable contrast is a signal selected from a group comprising one of the following: fluorescent light, elastic scattering light, Raman scattering, SHG, THG, stimulated Raman scattering, or a combination thereof.

According to an embodiment of the disclosure, the at least one excitation device is configured to excite the sample by using light-sheet illumination with a pulse having a pulse time not longer than the time period.

According to an embodiment of the disclosure, the at least one excitation device is constructed as a pulsed light source which comprises: one or more pulsed lasers, one or more light-emitting diodes operating at a pulsed mode, or a continuum light source modulated in various manners, or any combination thereof.

According to an embodiment of the disclosure, the at least one excitation device and the at least one detection device are configured to operate synchronously with each other.

According to an embodiment of the disclosure, the at least one excitation device further comprises an optical shaping device which comprises: one or more cylindrical mirrors, one or more cylindrical lenses, one or more anamorphotic lenses, one or more transmission phase devices, or one or more reflection phase devices; and the at least one excitation device is configured to form the light-sheet illumination.

According to an embodiment of the disclosure, the at least one excitation device generates at least one excitation light beam propagating in the detection target region in the excitation principal axis direction which is approximately perpendicular to a detection direction of the at least one detection device.

According to an embodiment of the disclosure, the at least one excitation device comprises at least one scanning mechanism which is configured to perform scanning by moving the excitation light beam.

According to an embodiment of the disclosure, the excitation light beam is shaped to have a beam radius which has a varying rate of not more than 3 times within the detection target region in a direction of the light beam.

According to an embodiment of the disclosure, the at least one scanning mechanism comprises one or more galvanometer scanners, one or more resonant scanning mirrors, one or more rotating polygonal mirror, one or more acousto-optic modulators, or any combination thereof.

According to an embodiment of the disclosure, the at least one detection device uses a matrix photosensitive device to function as the imaging device configured to operate synchronously with the scanning mechanism.

According to an embodiment of the disclosure, the at least one detection device comprises a de-scanning mechanism which is configured to operate synchronously with the scanning mechanism, and is provided with an array photosensitive device or a matrix photosensitive device to function as the imaging device.

According to an embodiment of the disclosure, the at least one excitation device comprises a beam splitter which is configured to split the excitation light beam into a plurality of excitation sub-beams.

According to an embodiment of the disclosure, the beam splitter comprises a combination of one or more lens arrays, one or more mirror arrays, one or more semi-transparent mirrors or a combination thereof, or comprises a fixed or adjustable phase filter or a digital micro mirror device (abbreviated as DMD) array.

According to an embodiment of the disclosure, the at least one excitation device and the at least one detection device are configured to form collectively a structure for confocal scanning microscopy.

In the present disclosure, there is further provided a three-dimensional microscopic imaging method, comprising:

generating a detectable contrast in a detection target region of the sample which is to be detected, in an excitation principal axis direction, with at least one excitation device;

detecting the contrast as generated from the detection target region of the sample in a detection principal axis, with at least one detection device, without eliminating that the at least one detection device shares its components with the at least one excitation device;

a relative movement of the sample relative to the at least one excitation device and the at least one detection device is implemented in a direction which is neither parallel to nor perpendicular to the excitation principal axis direction and also is neither parallel to nor perpendicular to the detection principal axis direction.

According to an embodiment of the disclosure, the three-dimensional microscopic imaging method further comprises eliminating blurring incurred by the relative movement with a de-convolution algorithm.

A portion of additional aspects and advantages of embodiments of the disclosure may be provided in following depictions, while other portions may become apparent from following depictions or become known according to practice of the embodiments of the disclosure.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which:

FIG. 4A illustrates a coronal sectional view by a three-dimensional reconstruction of a imaging result for a brain slice having a thickness of hundreds of micrometers, FIG. 4B illustrates fine structures of neuron somas and neuron dendrites in a relatively small range of the brain slice, and FIG. 4C illustrates fine structures of neuron axons and the like which are captured in a certain imaging plane;

FIGS. 7A to 7C illustrate a de-convolution algorithm for eliminating blurring incurred by movement so as to improve image quality, wherein FIG. 7A illustrates nano-scale fluorescent beads photographed in a stationary state, FIG. 7B illustrates a situation of an exposure lasting for 10 milliseconds during a movement of 1 millimeter per second, and FIG. 7C illustrates a result after the de-convolution processing;

DETAILED DESCRIPTION OF THE DISCLOSURE

Figure 1A:
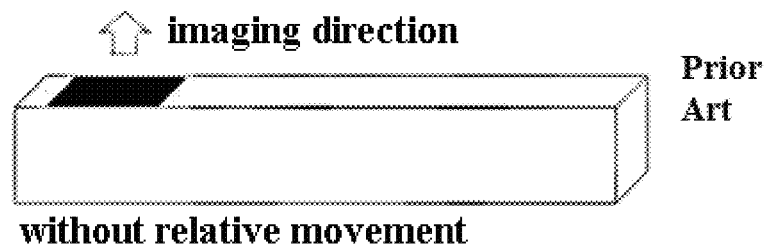
FIGS. 1A to 1G illustrate a solution typically used in relevant art for implementing a three-dimensional imaging.

In order to make clearer the purposes, technical solutions and advantages of the disclosure, exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; and it should be noticed that, the embodiments and features therein of the disclosure may be combined with each other or one another randomly, provided that there is no conflict therebetween or there among.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. Therefore, a protection scope of the disclosure may not be limited to these specific embodiments.

Respective dimension and shape of each component in the drawings are only intended to exemplarily illustrate the contents of the disclosure, rather than to demonstrate practical dimension or proportion of components of the microscope having three-dimensional imaging capability.

A microscope having three-dimensional imaging capability and a three-dimensional microscopic imaging method according to embodiments of the disclosure are depicted in detail hereinafter, with reference to the drawings.

Figure 1B:
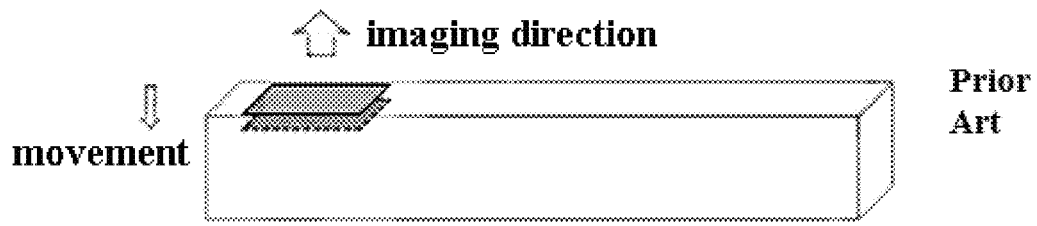
Figure 1C:
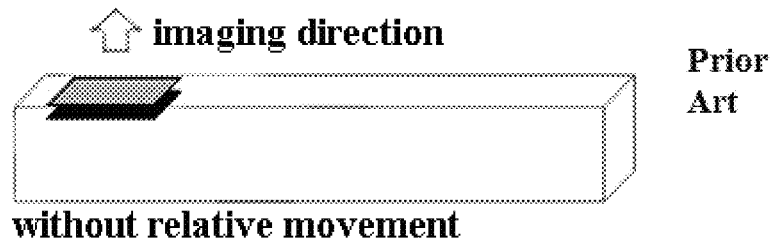
Figure 1D:
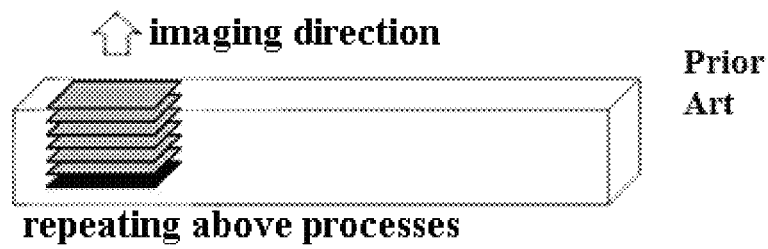
Figure 1E:
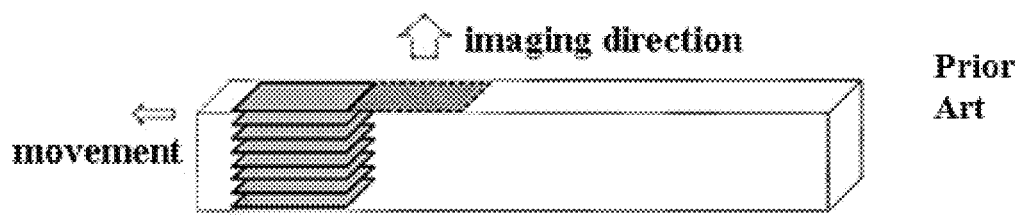
Figure 1F:
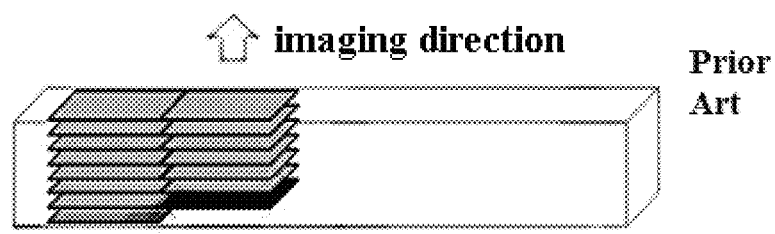
Figure 1G:
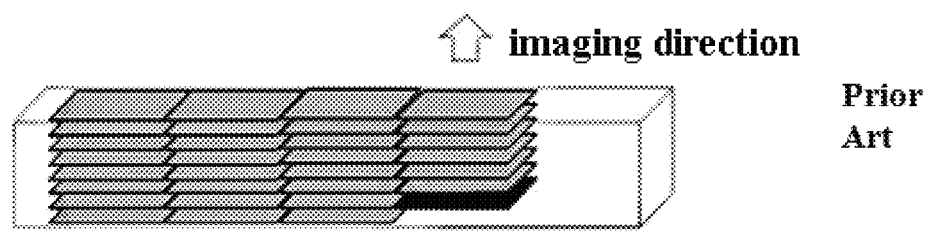

FIGS. 1A to 1G illustrate solutions typically adopted for implementing three-dimensional imaging in prior art Specifically, the three-dimensional imaging of a sample may for example comprise following steps:

a step of imaging in a field of view (referred to as one "local imaging" process), as illustrated in FIGS. 1A to 1D, comprising:

above all, as illustrated in FIG. 1A, imaging a plane perpendicular to an imaging direction (i.e., a detection principal axis direction, generally referred to as 'z' direction), for example a point-by-point imaging, or an imaging across a portion or all of the field of view during a same time period or at a same moment, such as confocal scanning microscopy, or selective/single plane illumination microscopy (abbreviated as SPIM, or referred to as light sheet fluorescence microscopy (abbreviated as LSM)), or the like;

next, driving the sample to perform a relative movement in z direction with respect to an excitation device and a detection device to a new imaging position, depending on resolution requirement, as illustrated in FIG. 1B;

then, imaging at the new imaging position, as illustrated in FIG. 1C; and subsequently, repeating above movement and imaging, as illustrated in FIG. 1D, until a three-dimensional imaging in a field of view covering all of the sample in the z direction is completed, then, a step of moving to and imaging in another field of view (i.e., referred to as another "local imaging" process), as illustrated in FIGS. 1E and 1F, specifically comprising:

moving the sample in a direction perpendicular to the z direction to a new field of view, as illustrated in FIG. 1E; and next, performing a three-dimensional imaging in the new field of view as illustrated in FIG. 1F, and then, repeating the movement of the sample and imaging within the new field of view until a three-dimensional imaging in the new field of view covering all of the sample in the z direction is completed, subsequently, repeating above movement and imaging, until a complete three-dimensional imaging for the whole sample in several fields of view each covering all of the sample in the direction perpendicular to the z direction is completed (i.e., "local imaging" processes are carried out several times in several fields of view each covering all of the sample in the direction perpendicular to the z direction, and then individual results of respective "local imaging" processes are combined/spliced together to form an overall three-dimensional imaging of the sample), as illustrated in FIG. 1G. In above processes, a mass of processes interrupting the imaging are involved therein. For example, a movement time may be required for each movement itself; and a waiting time may be required for further waiting for waiting for dissipation or vanishment of vibration caused by start/restart, or pause/stop till the sample reaches a steady condition relative to the excitation device and the detection device, then imaging processes may proceed again, resulting in relatively long interruptions in imaging processes. And it may be seen that, above pauses in imaging processes are relevant to movements. And it is also required to take into consideration that, in a three-dimensional imaging technology which combines individual results of respective "local imaging" processes collectively to form an overall three-dimensional imaging of the sample, although it may be inevitable to incur the relative movements of the sample of a certain form with reference to the excitation device and the detection device, not all relative movements may require pauses in respective imaging processes. Conventional three-dimensional imaging may contain two types of relative movements: a first type relative movement, i.e., a relatively small relative movement which occurs between two adjacent data reading issues in a three-dimensional imaging process for imaging of different planes, within a single field of view, typically with an order of magnitudes which is below several micrometers; and a second type relative movement, i.e., a relatively large relative movement which occurs during each switching between two different fields of view, typically with an order of magnitudes which is above one hundred micrometers.

In the contents of following embodiments of the disclosure, an apparatus and a method may be illustrated, allowing an implementation of imaging without any pause or stop, i.e., an uninterrupted imaging, in the first type relative movement, minimizing any existence of the second type relative movement, resulting in an increased effective imaging time, and an enhanced imaging throughput.

A core technical concept of embodiments of the disclosure lies in decreasing unnecessary pause or stop in imaging processes. Furthermore, focusing on and conceiving around such core technical concept, a combination of a series of technologies may be used, with fundamental contents of the whole solution containing: by moving the sample while performing substantially uninterrupted imaging processes simultaneously, then, decreasing switching operations each of which occurs between adjacent fields of view and interrupts the imaging processes, facilitating elimination of blur incurred by movements of the sample during imaging processes in above implementations, and improving aberration and the like incurred in above implementations.

Figure 3:
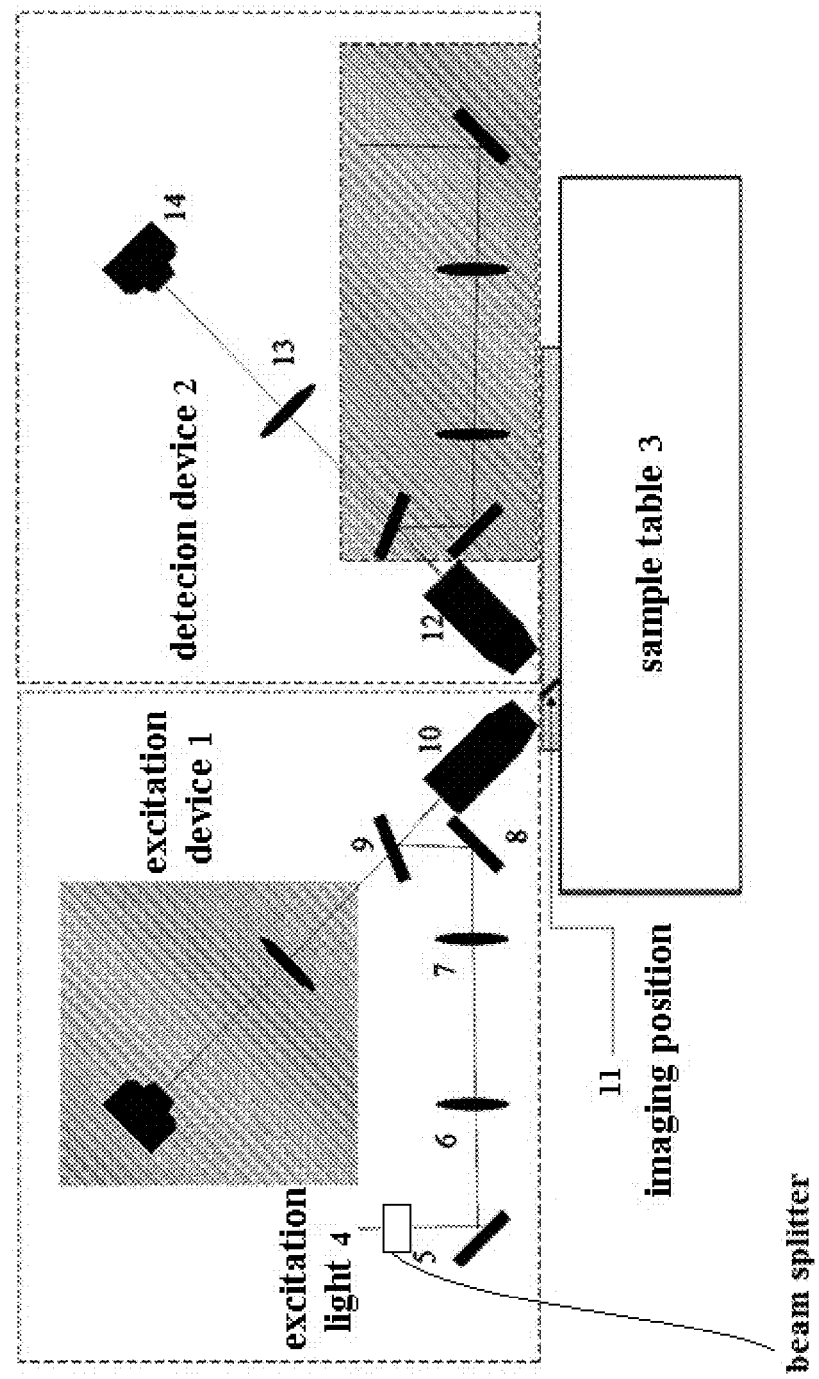
FIG. 3 illustrates a schematic diagram of principle of a three-dimensional imaging microscope, as an application instance according to embodiments of the disclosure.
Figure 5:
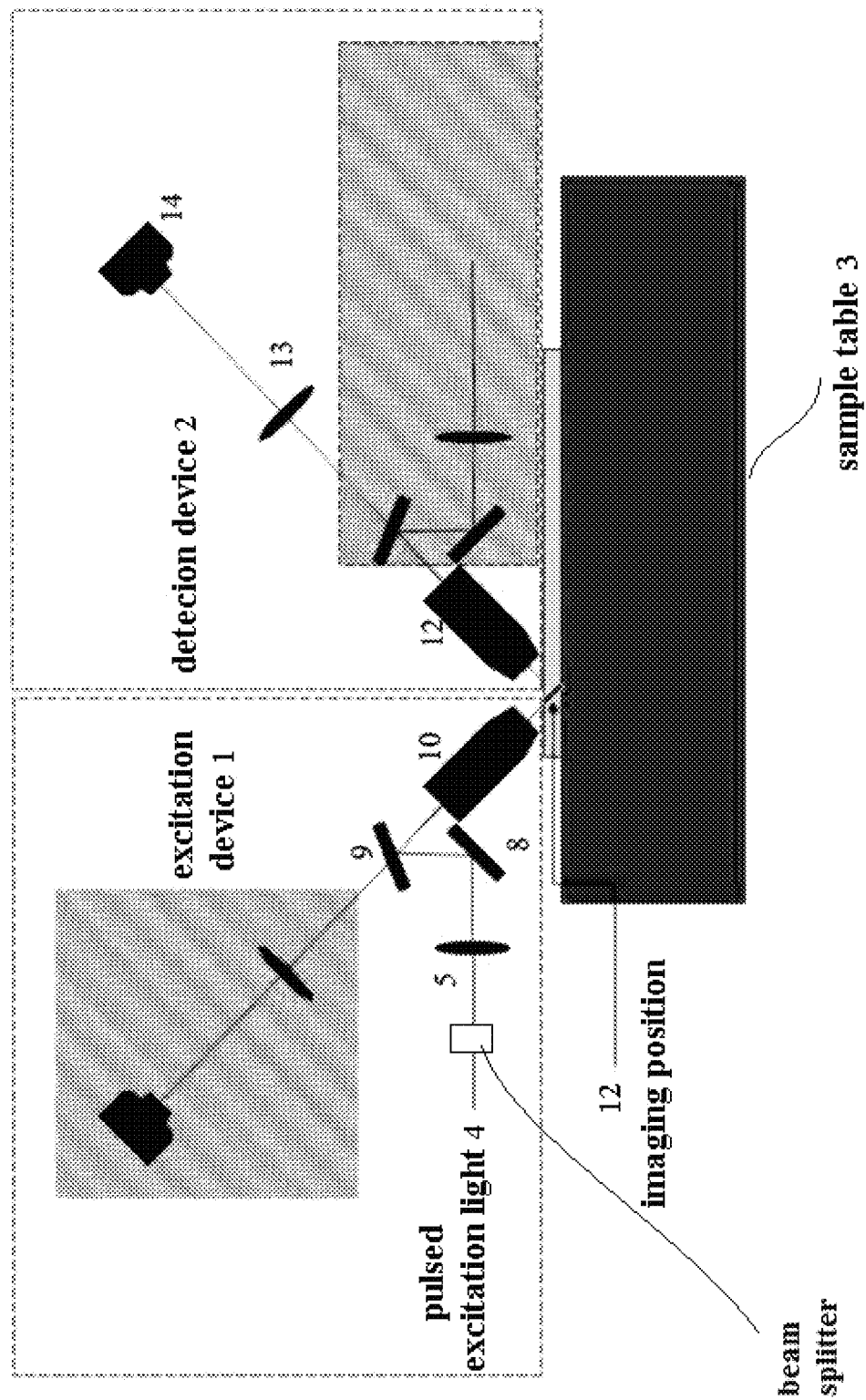
FIG. 5 illustrates a schematic diagram of principle of another three-dimensional imaging microscope, as another application instance according to embodiments of the disclosure.
Figure 6:
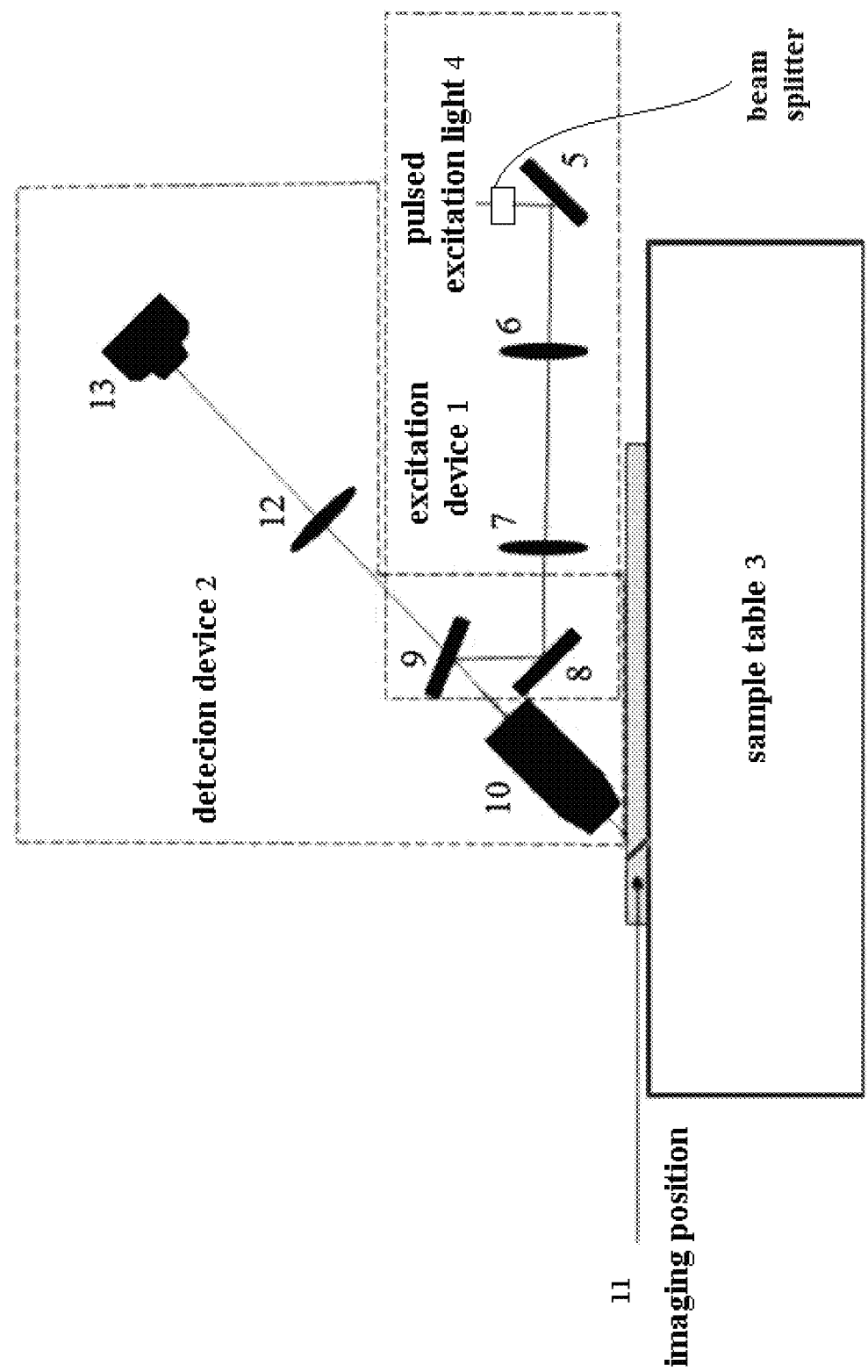
FIG. 6 illustrates a schematic diagram of principle of still another three-dimensional imaging microscope, as still another application instance according to embodiments of the disclosure.

In order to at least partially alleviate or eliminate above technical problems, according to a general technical concept of embodiments of the present disclosure, in an aspect of embodiments of the disclosure, there is provided a microscope having three-dimensional imaging capability which is configured to perform a three-dimensional detection and imaging on a sample, for example as illustrated in FIG. 3, FIG. 5 and FIG. 6, comprising: at least one excitation device 1, which is configured to emit a light beam propagating in an excitation principal axis direction (typically an optical principal axis direction of the excitation device, i.e., a central axis direction of the emitted light beam) and in turn being incident on a detection target region of the sample which is to be detected, the light beam exciting at least a portion of the sample within the detection target region and in turn generating a detectable contrast from the exited portion of the sample; at least one detection device 2, which is arranged in alignment with the detection target region of the sample in a detection principal axis direction being angled with respect to the excitation principal axis (the detection principal axis direction typically being an optical principal axis direction of the detection device, i.e., a central axis direction in a detection range thereof), and is configured to detect the contrast as generated from the detection target region of the sample in the detection principal axis and in turn to perform imaging depending on the detected contrast, without eliminating a possibility that the detection device 2 shares its components with the excitation device 1; and at least one movement mechanism, e.g., a sample table 3 as illustrated, which is configured to generate a relative movement (e.g., a horizontal relative movement) of the sample relative to the at least one excitation device 1 and the at least one detection device 2 (for example in a horizontal direction). In overall processes of imaging a three-dimensional region of the sample to be detected, it is to be implemented that neither imaging processes nor the relative movements has pause or stop therein, and the relative movement is implemented in a direction (i.e., a direction of the relative movement(s)) which is neither parallel to nor perpendicular to the excitation principal axis direction (i.e., a direction of a light beam emitted by the excitation device 1, as illustrated in FIGS. 3, 5 and 6) and also is neither parallel to nor perpendicular to the detection principal axis direction (i.e., a direction in which the light beam propagates in the detection device, as illustrated in FIGS. 3, 5 and 6). And it is required that a choice of the direction of each relative movement should contribute to decrease switching operations each of which occurs between adjacent fields of view and interrupts the imaging processes.

And the relative movements during imaging may be set at a constant speed substantially without any stop, thus eliminating any irregular dithering incurred by speed change, start, or pause or stop. Accordingly, any imaging blurring incurred by potentially existing movement may be simple and consistent, for example, such that the imaging blurring may be readily eliminated by computation/calculation such as de-convolution and the like.

Further, a technical solution constructed for implementing above general technical concept in embodiments of the disclosure may for example lie in that, in the detection target region of the detection device 2 which is practically detected, i.e., an effective detection region (in other words, a detected region from which effective detection data may be acquired, in each single detection therein), each sample unit which corresponds to each voxel (also referred to as "volumetric pixel" which is three-dimensional) to be formed by imaging (i.e., said each sample unit may be processed into a respective one voxel, for example by above acquisition, photoelectric conversion, and digitization) may merely be excited by the at least one excitation device 1 for not longer than a predetermined time period (e.g., a preset threshold time period), for example, the sample unit is excited by the light beam emitted by the excitation device 1 so as to produce fluorescent light; and in such predetermined time period, a displacement of each of sample units due to the relative movement is not more than a requirement in resolution of the microscope, for example, a magnitude of the relative movement is smaller than the resolution of the microscope, or roughly at a same order of magnitude as the resolution of the microscope. As such, no matter whether an inspection is carried out at a time scale or at a resolving capability scale, blurring incurred by the relative movement(s) may be relatively small or even may be negligible.

According to an even further embodiment, in a specific implementation adopted by the present disclosure, for example, during imaging, an environment where the sample is located (for example, in a vessel accommodating the sample, such as a measuring cup, and the like) may be filled with a transparent material which may be selected as a transparent solid material, transparent liquid material, or a transparent solid-liquid mixture either having its refractive index similar or approximately equal to a refractive index of the sample.

In an embodiment of the disclosure, the excitation device 1 may for example comprise an excitation light source selected from a group comprising: one or more light-emitting diodes, one or more continuous lasers, one or more pulsed lasers, or any combination thereof. And the detectable contrast may for example be a signal selected from a group comprising one of the following: fluorescent light, elastic scattering light, Raman scattering, SHG, THG, stimulated Raman scattering, or the like, or a combination thereof. Correspondingly, the at least one detection device 2 comprises photosensitive devices selected from a group comprising dot, array or matrix device(s) consisting of CCD photosensitive elements, CMOS photosensitive elements, photodiodes (abbreviated as PD, including avalanche photodiodes (abbreviated as APD), photomultipliers), or any combination thereof.

In an embodiment of the disclosure, the at least one excitation device 1 is specifically for example a pulsed light source configured to excite the sample by using light-sheet illumination (or referred to as light-sheet microscopy) with a pulse having a pulse time not longer than the predetermined time period; and the at least one detection device 2 is specifically for example an imaging device configured to use a matrix photosensitive devices such as a CCD camera, a CMOS camera, or the like to function as an imaging device.

In a further embodiment of the disclosure, the at least one excitation device 1 for example further comprises an optical shaping device for example comprising: one or more cylindrical mirrors, one or more cylindrical lens, one or more anamorphotic lenses, one or more transmission phase devices, or one or more reflection phase devices; and the optical shaping device is configured to form the light-sheet illumination.

In a further embodiment of the disclosure, the at least one excitation device is for example constructed as a pulsed light source which for example comprises: one or more pulsed lasers, one or more light-emitting diodes operating at a pulsed mode, or a continuum light source modulated in various manners (for example it is changed into a pulse light by modulation of amplitude, phase, frequency or polarization thereof), or any combination thereof. And the pulsed light source for example operates synchronously with the imaging device.

By way of example, as illustrated in FIG. 3, one specific implementation of the microscope having three-dimensional imaging capability lies in that, the at least one excitation device 1 generates at least one excitation light beam propagating in the excitation principal axis direction which is approximately perpendicular to a detection direction (i.e., the detection principal axis direction as above) of the at least one detection device 2; and the at least one excitation device 1 comprises at least one scanning mechanism which is configured to perform scanning by moving the excitation light beam emitted from the at least one excitation device 1.

By way of example, the excitation light beam is shaped to have a beam radius which has a varying rate (i.e., both magnification and de-magnification) of not more than 3 times within the detection target region in a direction of the light beam.

By way of example, one implementation of the at least one scanning mechanism lies in that, it comprises one or more galvanometer scanners, one or more resonant scanning mirrors, one or more rotating polygonal mirror, one or more acousto-optic modulators, or any combination thereof.

The at least one detection device 2 for example comprises a matrix photosensitive device such as a CCD camera, a CMOS camera, or the like to function as the imaging device which is configured to operate synchronously with the scanning mechanism. And the at least one detection device 2 for example comprises a de-scanning mechanism which is configured to operate synchronously with the scanning mechanism, and the de-scanning mechanism is for example provided with an array photosensitive device or a matrix photosensitive device, such as an LED array, a CCD camera, a CMOS camera to function as the imaging device.

According to embodiments of the disclosure, in order to form a uniform and extended illumination of the light beam for the sample, with the light beam, the at least one excitation device 1 for example comprises a beam splitter to function as the optical shaping device, and the beam splitter is for example arranged immediately neighboring downstream the pulsed light source and is configured to split the excitation light beam into a plurality of excitation sub-beams to excite various sub-regions within a range at an imaging position 11, so as to accelerate total scanning speed. The beam splitter for example specifically comprises a combination of one or more lens arrays, one or more mirror arrays, one or more semi-transparent mirror (i.e., half transparent and half reflecting mirror, or transflective mirror) arrays, or comprises a fixed or adjustable phase filter or a digital micro mirror device (abbreviated as DMD) array.

By way of example, another specific implementation of the microscope having three-dimensional imaging capability lies in that, the at least one excitation device 1 and the at least one detection device 2 are configured to cooperate with each other to form collectively a structure for confocal scanning microscopy.

In addition, according to another aspect of embodiments of the disclosure, there is further provided a three-dimensional microscopic imaging method, for example as illustrated in FIGS. 3, 5 and 6, comprising:

emitting a light beam propagating in an excitation principal axis direction and in turn incident on a detection target region of the sample which is to be detected, with at least one excitation device 1, exciting at least a portion of the sample within the detection target region and in turn generating a detectable contrast from the exited portion of the sample, by the light beam;

aligning with the detection target region of the sample in a detection principal axis direction angled with respect to the excitation principal axis, and detecting the contrast as generated from the detection target region of the sample in the detection principal axis and in turn performing imaging depending on the detected contrast, with at least one detection device 2, without eliminating that the at least one detection device 2 shares its components with the at least one excitation device 1; and moving the sample relative to the at least one excitation device and the at least one detection device, with at least one movement mechanism.

More specifically, the at least one movement mechanism is for example a sample table 3 as illustrated, which may for example move horizontally so as to generate a relative movement of the sample relative to the at least one excitation device 1 and the at least one detection device 2. In overall processes of imaging a three-dimensional region of the sample to be detected, it is to be implemented that neither imaging processes nor the relative movements has pause or stop therein, and the relative movement is implemented in a direction which is neither parallel to nor perpendicular to the excitation principal axis direction and also is neither parallel to nor perpendicular to the detection principal axis direction. And the relative movement during the imaging is at a constant speed without any stop.

Figure 2A:
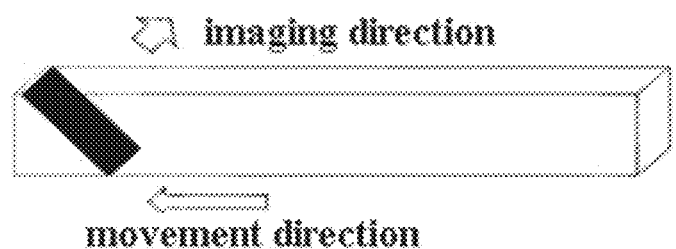
FIGS. 2A to 2C illustrate a principle of a three-dimensional imaging according to embodiments of the disclosure.
Figure 2B:
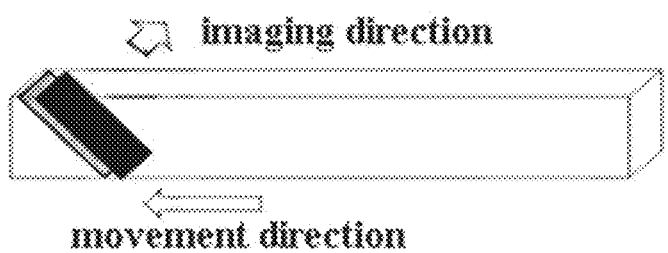
Figure 2C:
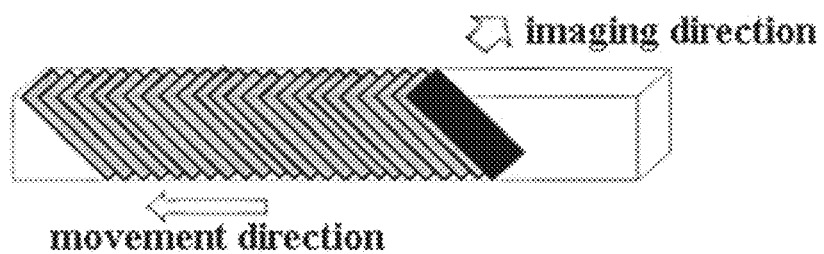

More specifically, FIGS. 2A to 2C illustrate an operation principle of three-dimensional imaging of the embodiments of the disclosure. As illustrated in FIGS. 2A to 2C, while the at least one detection device 2 is for example performing imaging with imaging device thereof, a continuous relative movement at a constant speed is for example maintained between the sample and the at least one detection device 2 (especially the imaging device thereof), and a direction of the relative movement of the sample with respect to the imaging device is neither parallel to nor coincide with an imaging direction of the imaging device, FIG. 2A illustrates an example in which a movement direction is at an angle of 45° with respect to the imaging direction; and then, as illustrated in FIGS. 2B and 2C, in embodiments of the disclosure, imaging processes are carried out continuously and uninterruptedly at new locations of a sample of a relatively large scale, until a three-dimensional imaging of the sample is finalized.

Then specific exemplary embodiments of the disclosure are set forth in detail hereinafter with reference to the drawings.

Figure 4A:
FIGS. 4A to 4C illustrate an instance of a fluorescence imaging for a whole brain of a mouse as acquired by the system of FIG. 3; specifically.
Figure 4B:
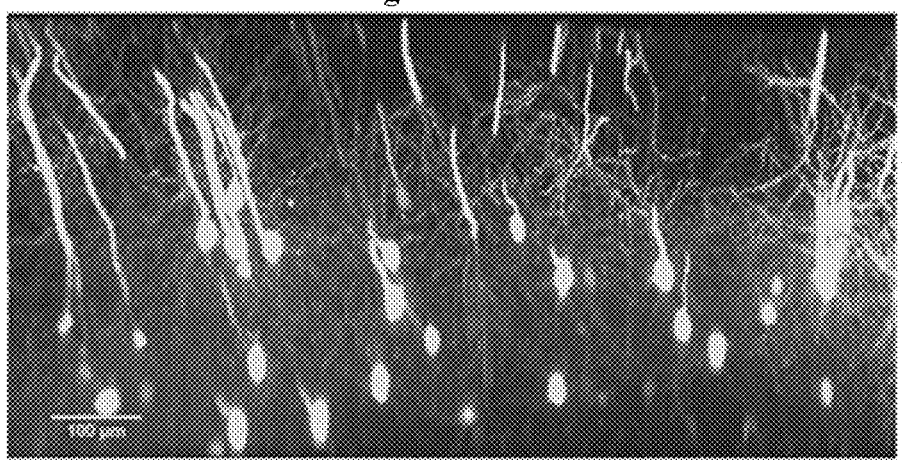
Figure 4C:
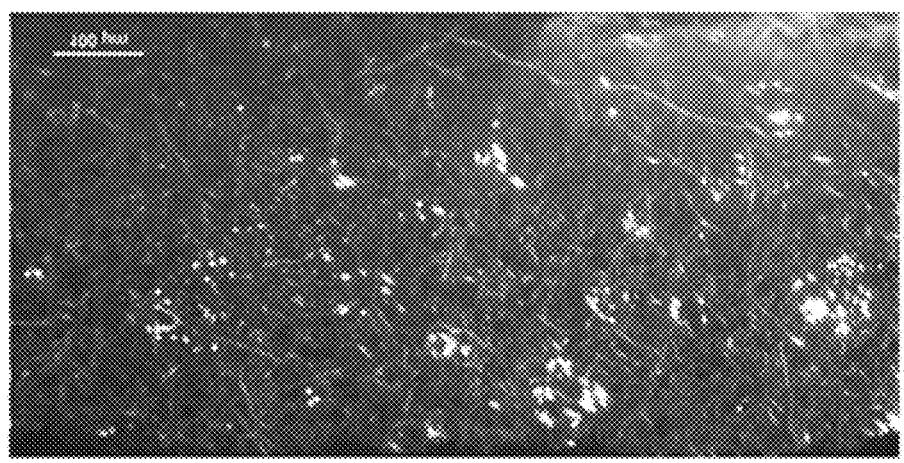

As an embodiment of the disclosure in a specific application, FIG. 3 illustrates a three-dimensional imaging microscope, which has a resolution requirement of 1 micrometer as for a sample having a thickness of 300 micrometers. Then fluorescent light is taken as an example for a contrast which is relied on during the imaging. By way of example, the contrast of the fluorescent light is supplied by excitation of fluorescent protein such as GFP and the like with a laser beam having a wavelength of 488 micrometer. The excitation device 1 and the detection device 2 may for example adopt symmetric multiplex structures, respectively, as appropriate; in other words, both sides (i.e., a side where the excitation device 1 is located, e.g., the left side as illustrated; and another side where the detection device 2 is located, e.g., the right side as illustrated) may be provided with excitation and detection functionalities. In a condition that a portion of devices as illustrated in shaded regions as illustrated are cancelled, then the left side is substantially simplified as a pure excitation device, while the right side is substantially simplified as a pure detection device. Principal axes of respective optical paths of the excitation device 1 and the detection device 2 may for example be perpendicular to each other as illustrated, and each of the excitation device 1 and the detection device 2 may form an angle of 45° with respect to a horizontal plane as illustrated (e.g., upper surface of the table, floor). The sample table 3 is for example illustrated to be parallel to the horizontal plane, and configured to carry and move the sample to the imaging position, such that the sample may continuously and successively move horizontally upon imaging. Respective front ends of the excitation device 1 and the detection device 2 with reference to the sample to be detected are objective lenses 10 and 12, respectively. By taking the objective lenses 10 and 12 as an example (for example, each being a type of Olympus UMPLFLN 20XW), for example, each has a numerical aperture of 0.5 and a work distance of 3.5 mm. A laser beam having a wavelength of 488 micrometers, which serves as the excitation light 4, may for example selectively pass through a telescope or a stop/diaphragm which is additionally provided and configured to perform both intensity adjustment functionality and beam-diameter adjustment functionality, and then be incident onto a galvanometer scanner 5 arranged immediately neighboring downstream the beam splitter, so as to generate a linear excitation light which scans in a plane perpendicular to the detection direction, behind the objective lens 10. Relay lenses 6, 7 are configured that the galvanometer scanner 5 and a back focal plane of the lens 10 are conjugate. Mirrors 8, 9 are configured to turn and twist path of scanning light rays being incident thereon through the relay lenses 6, 7 by reflection respectively, and hereby shorten optical path thereof so as to save space for arranging optical devices. In a microscope system containing devices which are located within the shaded region as illustrated, the mirror 9 is required to be a dichroic mirror which allows a long wave to pass therethrough. The excitation device 1 converges the excitation light beam at a position labeled by reference sign "11" within the sample as illustrated, i.e., the imaging position, so as to excite a fluorescent light from the sample. By way of example, an effective numerical aperture of the excitation device 1 is in a range of 0.03 to 0.04, so as to ensure that the converged excitation light beam has a beam waist radius of a varying rate of not more than 2 times, within a range of about 420 micrometers around a location having a minimum value of the beam waist radius. The detection device 2 images the position labeled by reference sign "11", i.e., the imaging position, and core elements of the detection device 2 are as follows, i.e., an objective lens 12, a tube lens 13 (which has a focal length of 125 millimeters) and a camera 14 (Hamamatsu Flash4.0 s CMOS camera). For example, the camera has a number of pixels of 2048×2048, and a pixel size of 6.5 micrometers×6.5 micrometers, with a full-frame frame rate of 100 Hz, i.e., 10 milliseconds per frame. And by way of example, the galvanometer scanner 5 is configured to perform scanning synchronously with a saw-tooth wave having a unidirectional rate of 10 milliseconds. The sample table 3 moves at a speed of for example 100 micrometers per second, i.e., 1 micrometer per frame. Thereby, blurring incurred by the movement is less than $1/200$, and thus is ignored. The sample for example has a target refractive index of 1.45 for index matching, and an optical matching solution may for example comprise HistoDenz. As such, the whole system may require about 16 minutes for completing a three-dimensional imaging for a sample having a size of 1 centimeter×1 centimeter, at a resolution of 1 micrometer; accordingly, it may require about 5 to 6 hours for implementing a fluorescence imaging for a whole brain of a mouse, which is significantly superior to relevant art. FIGS. 4A to 4C illustrates an instance of a fluorescence imaging for a whole brain of a mouse as acquired by the system; specifically, FIG. 4A illustrates a coronal sectional view by a three-dimensional reconstruction of a imaging result for a brain slice having a thickness of hundreds of micrometers, FIG. 4B illustrates fine structures of neuron somas and neuron dendrites in a relatively small range of the brain slice, and FIG. 4C illustrates fine structures of neuron axons and the like which are captured in a certain imaging plane.

In another embodiment, as illustrated in FIG. 5, a structure similar to that illustrated in FIG. 3 is adopted, but a pulsed light source is applied to provide light-sheet illumination. The pulsed light source 4 takes a nanosecond nitrogen molecule/dye laser having an operating frequency of 30 to 100 Hz as an example, for example, the exited laser beam may for example selectively pass through a telescope or a stop/diaphragm which is additionally provided and configured to perform both intensity adjustment functionality and beam-diameter adjustment functionality so as to form a rectangular light beam which in turn propagates and is incident on a cylindrical mirror 5 as illustrated. The cylindrical mirror for example has a focal length of 100 millimeters, and is configured that its cylindrical face is perpendicular to a plane which is defined collectively by principal axes of respective optical paths of the excitation device 1 and the detection device 2. Other devices are similar to those in the system as illustrated in FIG. 3. An image capture by a camera is performed synchronously with the pulsed light source. In a condition of an operating frequency of 100 Hz, the system as illustrated in FIG. 5 has a three-dimensional imaging capability similar to that of the system as illustrated in FIG. 3.

In still another embodiment, as illustrated in FIG. 6, a multi-photon scanning imaging structure is for example adopted. The excitation device 1 and the detection device 2 may share devices at their respective front end portions (with reference to the sample to be detected). A principal axis of the excitation device 1 forms an angle of 45° with respect to a direction perpendicular to an upper surface of the table (also to the floor), and a principal axis of the detection device 2 also forms an angle of 45° with respect to a direction perpendicular to an upper surface of the table (also to the floor). The sample table 3 is arranged parallel to the upper surface of the table, and configured to carry and move the sample to the imaging position, such that the sample may continuously and successively move horizontally upon imaging. Respective front ends of the excitation device 1 and the detection device 2 with reference to the sample to be detected may be an objective lens 10 (for example, being a type of Olympus UMPLFLN 20XW) which is common to the excitation device 1 and the detection device 2, for example having as a numerical aperture of 0.5 and a work distance of 3.5 mm. And a pulsed excitation light 4 for generating a multi-photon excitation is typically a femtosecond laser or a picosecond laser, and may for example selectively pass through a telescope or a stop/diaphragm which is additionally provided and configured to perform both intensity adjustment functionality and beam-diameter adjustment functionality, and then be incident onto a two-dimensional scanning mechanism 5 as illustrated, for generating a dotted excitation which scans in a plane perpendicular to the detection direction, behind the objective lens 10. Relay lenses 6, 7 are configured that the galvanometer scanner 5 and a back focal plane of the objective lens 10 are conjugate. Mirrors 8, 9 are configured to turn and twist path of scanning light rays being incident thereon through the relay lenses 6, 7 by reflection respectively, and hereby shorten optical path thereof so as to save space for arranging optical devices. The mirror 9 is a dichroic mirror which allows a long wave to pass therethrough. By way of example, an effective numerical aperture of the excitation device 1 is 0.5. The excitation device 1 carries out the excitation at a position labeled by reference sign "11" within the sample as illustrated, i.e., the imaging position. And the detection device 2 images the position labeled by reference sign "11", i.e., the imaging position, with its core devices similar to those in the system as illustrated in FIG. 5. The system may for example apply to a condition in which SNR (i.e., signal to noise ratio) requirement is higher than speed.

In yet another embodiment, in a device similar to the system as illustrated in FIG. 3, or similar to the system as illustrated in FIG. 6, for example, a beam splitter is inserted into an optical path of the excitation light 4 before entering the scanning mechanism 5, and is configured to split the excitation light beam into a plurality of excitation sub-beams, so as to form a uniform and extended illumination of the light beam for the sample, with the light beam, and at the same time to excite various sub-regions within a range at the imaging position 11, so as to accelerate total scanning speed.

In still yet another embodiment, additionally or alternatively, similar to the system as illustrated in FIG. 6, and as well-known to those skilled in a field of microscopy imaging, the detection device thereof may for example use high-speed detectors of other type, e.g., photodiodes (abbreviated as PD, including avalanche photodiodes (abbreviated as APD), photomultipliers or the like).

In further another embodiment, similar to the system as illustrated in FIG. 6, and as well-known to those skilled in a field of microscopy imaging, a portion of devices which are shared at respective front ends of the excitation device 1 and the detection device 2 may for example comprise the objective lens to the scanning mechanism in an upstream direction; then, in a detection portion of the detection device 2 separating from the portion of devices which are shared, a conjugate pinhole or aperture may be added at a position conjugated with the sample, so as to form collectively a structure for confocal scanning microscopy.

In an additional embodiment, similar to the systems as above, and as well-known to those skilled in a field of microscopy imaging, the excitation device may for example adopt an excitation light source, which may for example be: one or more light-emitting diodes, one or more continuous lasers, one or more pulsed lasers, or any combination thereof. And the contrast which is relied on during the imaging may for example be a signal selected from a group comprising one of the following: fluorescent light, elastic scattering light, Raman scattering, SHG, THG, stimulated Raman scattering, or the like, or a combination thereof.

In above embodiments, merely conditions in each of which the detection direction is at an angle of 45° with respect to the direction of the relative movement are exemplified. In other applications, the angle between the detection direction and the direction of the relative movement may for example be selected flexibly depending on specific requirements, mainly for being adapted to a contact angle of the objective lens as selected. By way of example, as to a system which has a relatively higher resolution requirement, an objective lens having a relatively larger numeral aperture may be chosen; and for being adapted thereto, the angle between the detection direction and the direction of the relative movement may for example be selected to be in a range of 55° to 65°. And the specific form of the relative movement may not be limited to a linear relative movement. For example, a relative movement in a form of a circumferential movement may alternatively be another exemplary form.

Figure 7A:
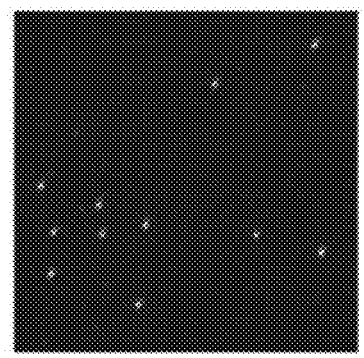
Figure 7B:
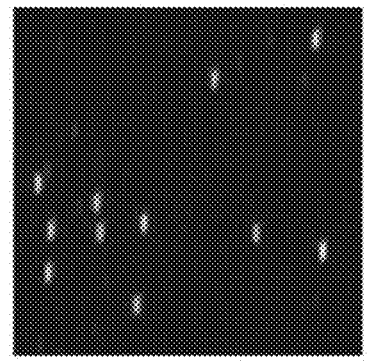
Figure 7C:
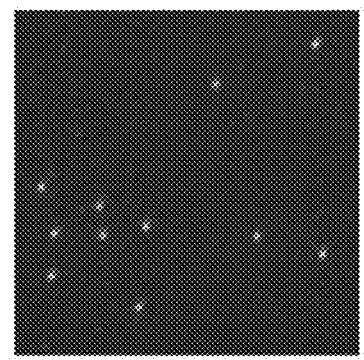
Figure 8:
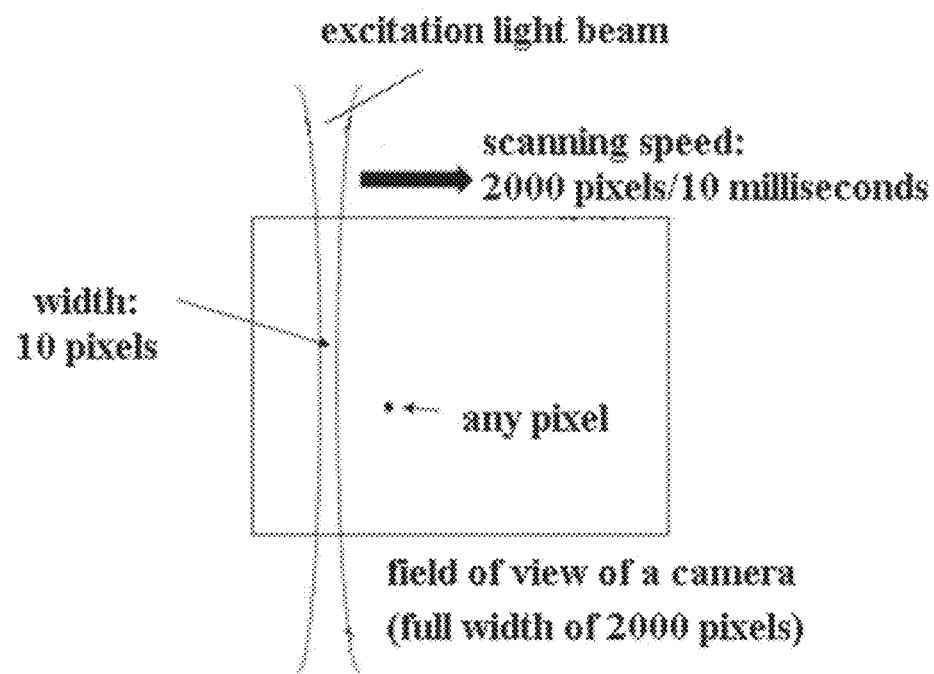
FIG. 8 illustrates an operation principle of inhibiting/suppressing blurring incurred by movement in the microscope or the imaging method according to embodiments of the disclosure, by scanning with a continuum light source.

Since there may exist a movement during the imaging, then in a captured image, there may exist blurring incurred by the movement. Since the blurring incurred by the movement herein may be simple and fixed, then, as a solution, an algorithm in relevant art for eliminating blurring incurred by movement may be adopted in embodiments of the disclosure so as to effectively improve image quality of the acquired images. FIG. 7A illustrates nano-scale fluorescent beads photographed in a stationary state; FIG. 7B illustrates a situation of an exposure lasting for 10 milliseconds during a movement of 1 millimeter per second, from which it can be seen that there may exist obvious blurring incurred by the movement having a substantially consistent orientation; and by a de-convolution processing, details of the image may be recovered from FIG. 7B, with its result being shown in FIG. 7C. As another solution, the blurring incurred by the movement may be suppressed, for example by restricting excitation time, with a main idea of ensuring that a movement of each point of the sample during the excitation time may be ignored as compared with the resolution requirement; briefly speaking, it is only required to ensure that a product (i.e., a displacement of the sample during the excitation time) of the excitation time multiplied by the movement speed is significantly smaller than a minimal scale which is resolvable, and in such a condition the blurring incurred by the relative movement within the excitation time may not be observed. If the resolution requirement is 1 micrometer, and the movement speed is 1 millimeter per second, then the excitation time is required to be less than 1 millisecond. A pulsed light source having a proper pulse width may directly satisfy such a requirement. And the continuum light source may for example provide illumination by a proper switch modulation; more effectively, the continuum light source may alternatively for example implement an excitation of a point in a relatively short time period by scanning. As illustrated in FIG. 8, for example, by taking an imaging camera as an example, a field of view of a microscope may for example have a width of 2000 pixels. Accordingly, a linear excitation light may have a width of about 10 pixels. Once the excitation light sweeps across the whole field of view within 0.01 second, then for each pixel, an effective excitation time thereof may be merely 0.01 second being above all divided by a ratio of 2000 and then being multiplied by a factor of 10, i.e., the effective excitation time for each pixel is 50 microseconds.

Figure 9:
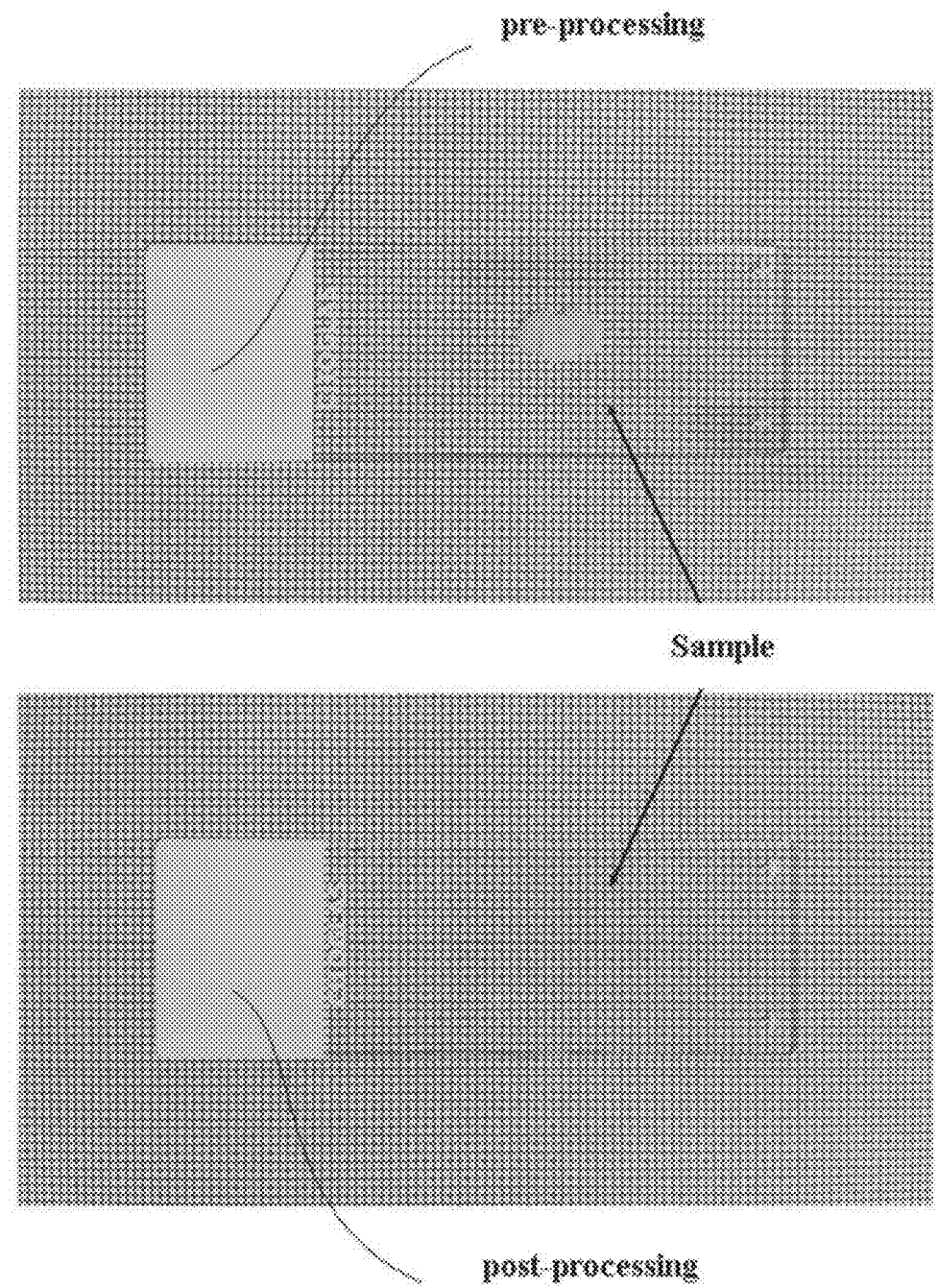
FIG. 9 demonstrates a refractive index matching being used to improve image quality acquired by microscopy according to an embodiment of the disclosure, in the microscope or the imaging method according to embodiments of the disclosure.

On the other hand, in the space where the sample in located, if there exist a difference in refractive indices between an optical path in which the excitation light leaves the excitation device and enters the sample and another optical path in which a signal light which is generated by an excitation of the sample and then leaves the sample and in turn enters the detection device, then a sample having a relatively larger thickness may be lack of transparency, and there may also exist a relatively larger aberration during the imaging simultaneously. In order to obtain a better SNR and a finer resolution, then it is proposed in embodiments of the disclosure to carry out a homogenization processing on both the transparency and refractive indices throughout the optical paths. FIG. 9 illustrates a contrast between a pre-processing effect and a post-processing effect.

As to above device and method according to embodiments of the disclosure, there are several advantages and beneficial effects thereof, specifically comprising: decreasing pause or stop in a three-dimensional imaging, including: firstly, moving the sample while performing substantially uninterrupted imaging processes simultaneously, and secondly, decreasing switching operations each of which occurs between adjacent fields of view and interrupts the imaging processes; and eliminating blurring incurred by movements of the sample during imaging processes in above implementations, and improving aberration and the like incurred in above implementations. As compared with relevant art, the device and method according to embodiments of the disclosure may enhance three-dimensional imaging throughput in a condition of a same resolution.

Technical purposes, technical solutions and beneficial effects of embodiments of the disclosure are further set forth in detail in above specific implementations. And it should be understood that, above contents are merely specific exemplary embodiments intended to illustrate the operation principle of the disclosure, rather than being limited thereto. As to those skilled in the art, various variations, equivalent replacement, and/or modifications may be made in these embodiments, without departing from the principles and spirit of the disclosure, and these variations, equivalent replacement, and/or modifications still lie within the scope of present application.

What is claimed is:

1. A microscope having three-dimensional imaging capability, comprising:
at least one excitation device, which is configured to generate a detectable contrast in a detection target region of a sample which is to be detected, in an excitation principal axis direction;

at least one detection device, which is configured to detect the contrast as generated from the detection target region of the sample in a detection principal axis; and at least one movement mechanism, which is configured to generate a relative movement of the sample relative to the at least one excitation device and the at least one detection device;

wherein the relative movement is implemented in a direction which is neither parallel to nor perpendicular to the excitation principal axis direction and also is neither parallel to nor perpendicular to the detection principal axis direction;

wherein in an overall process of imaging a three-dimensional region of the sample to be detected, neither the imaging process nor the relative movement has pause or stop therein, and the relative movement during the imaging is at a constant speed;

wherein in the detection target region to be detected by the at least one detection device, each of sample units is excited by the at least one excitation device for no longer than a time period in which a displacement of each of sample units due to the relative movement is no more than a requirement in resolution of the microscope, each sample unit in the detection target region of the sample being corresponding to a respective one of voxels which are imaged;

wherein the at least one excitation device and the at least one detection device are configured to operate synchronously with each other; and wherein blurring incurred by the relative movement is suppressed with a continuum light source which is configured to implement an excitation of a point of the sample in an excitation time, by providing illumination for imaging by a switch modulation or by scanning, said excitation time being restricted such that a product of the excitation time for the sample multiplied by the movement speed of the relative movement is smaller than a minimal scale which is resolvable for the requirement in resolution of the microscope.

2. The microscope having three-dimensional imaging capability according to claim 1, wherein an environment where the sample is located is filled with a transparent material having its refractive index equal to a refractive index of the sample.

3. The microscope having three-dimensional imaging capability according to claim 1, wherein the at least one excitation device comprises an excitation light source selected from a group comprising: one or more light-emitting diodes, one or more continuous lasers, one or more pulsed lasers, or any combination thereof.

4. The microscope having three-dimensional imaging capability according to claim 1, wherein the detectable contrast is a signal selected from a group comprising one of the following: fluorescent light, elastic scattering light, Raman scattering, SHG, THG, stimulated Raman scattering, or a combination thereof.

5. The microscope having three-dimensional imaging capability according to claim 1, wherein the at least one excitation device generates at least one excitation light beam which is perpendicular to a detection direction of the at least one detection device.

6. A microscope having three-dimensional imaging capability according to claim 5, wherein the at least one excitation device comprises at least one scanning mechanism which is configured to perform scanning by moving the excitation light beam.

7. The microscope having three-dimensional imaging capability according to claim 6, wherein the excitation light beam is shaped to have a beam radius which has a varying rate of not more than 3 times within the detection target region in a direction of the light beam.

8. The microscope having three-dimensional imaging capability according to claim 6, wherein the at least one scanning mechanism comprises one or more galvanometer scanners, one or more resonant scanning mirrors, one or more rotating polygonal mirrors, one or more acousto-optic modulators, or any combination thereof.

9. The microscope having three-dimensional imaging capability according to claim 6, wherein the at least one detection device uses a matrix photosensitive device to function as an imaging device configured to operate synchronously with the scanning mechanism.

10. The microscope having three-dimensional imaging capability according to claim 9, wherein the at least one detection device comprises a de-scanning mechanism which is configured to operate synchronously with the scanning mechanism, and is provided with an array photosensitive device or a matrix photosensitive device to function as the imaging device.

11. The microscope having three-dimensional imaging capability according to claim 1, wherein the at least one excitation device comprises a beam splitter which is configured to split the excitation light beam into a plurality of excitation sub-beams.

12. The microscope having three-dimensional imaging capability according to claim 11, wherein the beam splitter comprises a combination of one or more lens arrays, one or more mirror arrays, one or more semi-transparent mirrors or a combination thereof, or comprises a fixed or adjustable phase filter or a digital micro mirror device (abbreviated as DMD) array.

13. The microscope having three-dimensional imaging capability according to claim 1, wherein the at least one excitation device and the at least one detection device are configured to form collectively a structure for confocal scanning microscopy.

14. The microscope having three-dimensional imaging capability according to claim 1, wherein the at least one excitation device comprises an excitation light source selected from the group consisting of one or more light-emitting diodes, one or more continuous lasers, and one or more pulsed lasers.

15. The microscope having three-dimensional imaging capability according to claim 1, wherein the at least one detection device comprises a photosensitive device selected from the group consisting of dot, array and matrix devices.

16. The microscope having three-dimensional imaging capability according to claim 15, wherein each of the dot, array and matrix devices is selected from the group consisting of CCD photosensitive elements, CMOS photosensitive elements, photodiodes, and photomultipliers.

17. The microscope having three-dimensional imaging capability according to claim 1, wherein the at least one movement mechanism comprises a sample table which moves horizontally to generate a relative movement of the sample relative to the at least one excitation device and the at least one detection device.

18. The microscope having three-dimensional imaging capability according to claim 1, wherein the microscope is in a condition that the continuum light source is configured to implement an excitation of a point of the sample in an excitation time by scanning, the excitation light which is continuum light produced by the scanning of the continuum light source is set such that a time during which the excitation light sweeps across a field of view of the microscope is divided by a width of the field of view of the microscope and then multiplied by a width of the excitation light so as to obtain a result value which is smaller than the excitation time, thereby facilitating a condition that blurring incurred by the relative movement is not observable within the excitation time.

19. The microscope having three-dimensional imaging capability according to claim 18, wherein the microscope is in a condition that an imaging camera is taken as reference, the field of view of the microscope has a width of 2000 pixels and a linear excitation light which is excited has a width of 10 pixels, such that once the excitation light sweeps across the whole field of view within 0.01 second, then for each pixel, an effective excitation time thereof is calculated to be: 0.01 second being divided by a ratio of 2000 and then being multiplied by a factor of 10, so as to get a value of the effective excitation time for each pixel which is equal to 50 microseconds.

20. A three-dimensional microscopic imaging method, comprising:
    generating a detectable contrast in a detection target region of the sample which is to be detected, in an excitation principal axis direction, with at least one excitation device;
    detecting the contrast as generated from the detection target region of the sample in a detection principal axis, with at least one detection device, without eliminating that the at least one detection device shares its components with the at least one excitation device;
    wherein a relative movement of the sample relative to the at least one excitation device and the at least one detection device is implemented in a direction which is neither parallel to nor perpendicular to the excitation principal axis direction and also is neither parallel to nor perpendicular to the detection principal axis direction;
    wherein in an overall process of imaging a three-dimensional region of the sample to be detected, neither the imaging process nor the relative movement has pause or stop therein, and the relative movement during the imaging is at a constant speed;
    wherein in the detection target region to be detected by the at least one detection device, each of sample units is excited by the at least one excitation device for no longer than a time period in which a displacement of each of sample units due to the relative movement is no more than a requirement in resolution of the microscope, each sample unit in the detection target region of the sample being corresponding to a respective one of voxels which are imaged;
    wherein the at least one excitation device and the at least one detection device are configured to operate synchronously with each other; and
    wherein blurring incurred by the relative movement is suppressed with a continuum light source which is configured to implement an excitation of a point of the sample in an excitation time, by providing illumination for imaging by a switch modulation or by scanning, said excitation time being restricted such that a product of the excitation time for the sample multiplied by the movement speed of the relative movement is smaller than a minimal scale which is resolvable for the requirement in resolution of the microscope.

21. The three-dimensional microscopic imaging method according to claim 20, further comprising eliminating blurring incurred by the relative movement with a de-convolution algorithm.

22. The three-dimensional microscopic imaging method according to claim 20, wherein the method is in a condition that the continuum light source is configured to implement an excitation of a point of the sample in an excitation time by scanning, the excitation light which is continuum light produced by the scanning of the continuum light source is set such that a time during which the excitation light sweeps across a field of view of the microscope is divided by a width of the field of view of the microscope and then multiplied by a width of the excitation light so as to obtain a result value which is smaller than the excitation time, thereby facilitating a condition that blurring incurred by the relative movement is not observable within the excitation time.

23. The three-dimensional microscopic imaging method according to claim 22, wherein the method is in a condition that an imaging camera is taken as reference, a field of view of the microscope has a width of 2000 pixels and a linear excitation light which is excited has a width of 10 pixels, such that once the excitation light sweeps across the whole field of view within 0.01 second, then for each pixel, an effective excitation time thereof is calculated to be: 0.01 second being divided by a ratio of 2000 and then being multiplied by a factor of 10, so as to get a value of the effective excitation time for each pixel which is equal to 50 microseconds.

* * * * *